(12) United States Patent
Antunes et al.

(10) Patent No.: US 8,821,029 B2
(45) Date of Patent: Sep. 2, 2014

(54) CONNECTING MODULE BETWEEN A DRIVE SHAFT OF AN ENGINE FAN AND A ROLLING-ELEMENT BEARING

(75) Inventors: Serge Louis Antunes, Combs la Ville (FR); Francois Mouly, Noisy le Grand (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 13/822,192

(22) PCT Filed: Oct. 12, 2011

(86) PCT No.: PCT/FR2011/052378
§ 371 (c)(1),
(2), (4) Date: Mar. 11, 2013

(87) PCT Pub. No.: WO2012/049422
PCT Pub. Date: Apr. 19, 2012

(65) Prior Publication Data
US 2013/0163911 A1 Jun. 27, 2013

(30) Foreign Application Priority Data

Oct. 13, 2010 (FR) ...................................... 10 58350

(51) Int. Cl.
*F16C 41/00* (2006.01)
*F01D 25/16* (2006.01)
*F16D 3/24* (2006.01)
(52) U.S. Cl.
CPC ....... *F01D 25/166* (2013.01); *F05B 2260/3011* (2013.01); *F16D 3/24* (2013.01); *F01D 25/162* (2013.01); *F05D 2260/30* (2013.01)
USPC .............................................. 384/624; 415/9
(58) Field of Classification Search
USPC ............................................... 384/624; 415/9
See application file for complete search history.

(56) References Cited

U.S. PATENT DOCUMENTS

| 3,727,998 | A | * | 4/1973 | Haworth et al. ................. 384/99 |
| 6,331,078 | B1 | | 12/2001 | Van Duyn |
| 6,491,497 | B1 | * | 12/2002 | Allmon et al. ................. 384/624 |
| 8,167,531 | B2 | * | 5/2012 | Mollmann et al. ................. 415/9 |
| 8,573,922 | B2 | * | 11/2013 | Milfs ............................ 384/624 |
| 2003/0210979 | A1 | | 11/2003 | Doerflein et al. |
| 2005/0172608 | A1 | | 8/2005 | Lapergue et al. |

FOREIGN PATENT DOCUMENTS

| EP | 1 013 896 A2 | 6/2000 |
| EP | 1 013 896 A3 | 6/2000 |

(Continued)

OTHER PUBLICATIONS

International Search Report issued May 15, 2012 in PCT/FR2011/052378.

*Primary Examiner* — Thomas R Hannon
(74) *Attorney, Agent, or Firm* — Oblon, Spivak, McClelland, Maier & Neustadt, L.L.P.

(57) ABSTRACT

A connecting module interposed between a drive shaft of an aircraft engine fan and a rolling-element bearing, wherein the module includes an inner structure attached to the shaft and including a bonnet, and an outer structure attached to the bearing, which is radially supported on a mechanism installed on the inner structure and delimiting a raceway which is complementary to the bonnet so as to form a ball-joint connection kept in a blocked state by a blocking device installed on the inner structure and protruding radially from the bonnet, wherein a mechanism forming a mechanical fuse provides a junction between the device and the bonnet, such that the ball-joint connection is released following fracture of this mechanism forming a mechanical fuse. The radial support mechanism is added to the device.

10 Claims, 3 Drawing Sheets

(56) References Cited

FOREIGN PATENT DOCUMENTS

| | | | |
|---|---|---|---|
| EP | 1 564 352 A2 | 8/2005 |
| EP | 1 564 352 A3 | 8/2005 |
| EP | 1 653 051 A1 | 5/2006 |
| EP | 1 916 431 A1 | 4/2008 |
| FR | 2115316 A1 | 7/1972 |
| FR | 2 752 024 A1 | 2/1998 |
| FR | 2 888 621 A1 | 1/2007 |

* cited by examiner

CONNECTING MODULE BETWEEN A DRIVE SHAFT OF AN ENGINE FAN AND A ROLLING-ELEMENT BEARING

TECHNICAL FIELD

The present invention relates to the field of aircraft engines with fan(s) and, more specifically, to the means implemented within these engines to respond to the unbalance caused by the loss of a fan blade. This problem is notably addressed in documents EP 1 653 051, EP 1 916 431, FR 2 752 024 and FR 2 888 621.

The invention applies in particular to turbojets.

STATE OF THE PRIOR ART

With reference to FIG. 1, a portion of an aircraft turbojet 1, of a known design of the prior art, can be seen represented schematically.

Conventionally, this turbojet 1 has a longitudinal axis 2 on which are centred a fan rotor 4 holding fan blades 6, together with a drive shaft 8 rigidly mounted such that it rotates with rotor 4, also called a fan disk.

Turbojet 1 also includes a casing/stator 10 forming an immobile rigid case, where this casing is represented very schematically in FIG. 1. To hold and guide shaft 8, there are three rolling-element bearings, spaced one after another in the direction of axis 2, where these bearings are referenced respectively, from forward to rear, 12a, 12b and 12c.

The outer ring of each of these three rolling-element bearings is attached to casing 10 by connection means respectively referenced 14a, 14b and 14c. each of these connection means takes the form of a bearing bracket forming an annular structure connecting the outer ring directly to the casing, or to an internal extension of this casing, as is the case for forward bearing 12a, located closest to rotor 4.

Forward-most bearing 12a and rear-most bearing 12c are each designed to transmit radial forces, whereas intermediate rolling-element bearing 12b is also designed to retain shaft 8 axially.

In respect of forward bearing 12a, its bearing bracket 14a is connected to casing 10 by a fusible mechanical link 16a. This link is made, for example, using screws, the number, dimensioning and positions of which are chosen so as to give the desired fusible character, which will be explained below.

In the normal flight configuration as represented schematically in FIG. 1, fusible mechanical link 16a is sufficiently resistant to withstand the radial forces transmitted by forward bearing 12a, which is used to maintain the rotation of shaft 8 in longitudinal axis 2 of the turbojet.

In the event of an exceptional problem leading to the loss of one or more fan blades 6, rotor 4 is subjected to an unbalance, which causes extremely high radial forces in the structures of the turbojet, and in particular in bearing brackets 14a, 14b and 14c.

As previously mentioned, fusible mechanical link 16a is designed to fracture when bracket 14a is subjected to these extremely high radial forces, the magnitude of which can be predetermined. With reference to FIG. 2, the almost-immediate consequence of these fractures is the radial displacement of rotor 4. Drive shaft 8, which continues to be held in axis 2 by intermediate bearing 12b and by rear bearing 12c, follows the displacement of the rotor by undergoing a deflection. With this regard, a connecting module 18 interposed between shaft 8 and intermediate bearing 12b is able to be transformed into a ball-joint connection after the loss of a blade, following the fracture of a mechanical fuse, as will be explained below. This acts in favour of a sounder deflection of the shaft, since a deflection node is created in the area of this intermediate bearing forming a ball-joint connection, as is represented schematically in FIG. 2.

The amplitude of the deflection is limited by multiple contacts of the rotor with areas of the stator which are predefined at the design stage of the turbomachine's architecture. It is also limited by the axial abutment of bracket 14a against the extension of casing 20a, which was initially supporting fusible link 16a. This state, shown in FIG. 2, therefore shows a localised contact 22 between bracket 14a and the extension of casing 20a, where the latter takes the form of an annular raceway.

When contact has been made, shaft 8 is subject, in a manner known to those skilled in the art, to a precession movement during which it continues to rotate on itself, whilst remaining deflected, and therefore also rotates around longitudinal axis 2 from which it remains angularly offset, except in the area of the two bearings 12b, 12c, which continue sporadically to guide and centre this shaft 8 on axis 2.

The precession movement of shaft 8 and of its rotor 4, combined with the contact of elements 14a, 20a, causes bracket 14a to move relative to the extension of casing 20a. This relative movement is a rolling movement, habitually without sliding, due to the very high contact forces.

The design as described above is such that it causes the fastest possible mechanical decoupling. The design is such, for example, that a duration of the order of one millisecond is not exceeded between the instant of the loss of fan blade 6, and the instant of the fracture of fusible mechanical link 16a.

This system of mechanical decoupling, despite the high unbalance resulting from the loss of the blade, enables the integrity of the turbojet's structures to be maintained.

As was mentioned above, a connecting module 18 is installed between drive shaft 8 of fan rotor 4 and intermediate rolling-element bearing 12b. This module essentially comprises a ball-joint connection which is kept in a blocked state under normal flight conditions. To accomplish this, the module includes an inner annular structure attached to the drive shaft, and having a bonnet, and also an outer annular structure which is fixed relative to an inner ring of the intermediate rolling-element bearing. In addition, this outer structure delimits a raceway the shape of which is complementary to that of the bonnet, so as to form, jointly, this said ball-joint connection. In addition, the outer structure is radially supported on the inner structure by means of a contact between the spherical raceway and the raceway of complementary shape, which are tightly fitted to one another.

In addition, to hold the ball-joint connection in the blocked state, there are fusible slugs between the module's inner and outer structures. The main disadvantage of this solution lies in the fact that once the ball-joint connection has become unblocked its operation may be disturbed by the resistant forces due to the tight fitting which remains between the spherical raceways. In addition, controlling the change of state of the ball-joint connection is delicate, and requires lengthy and expensive adjustments.

SUMMARY OF THE INVENTION

The purpose of the invention is therefore to provide at least partially a solution to the disadvantages mentioned above, compared with the embodiments of the prior art.

To accomplish this, one object of the invention is a connecting module intended to be interposed between a drive shaft of a rotor of a fan of an aircraft engine, and a rolling-element bearing designed to transmit radial and axial forces, where the said module includes, firstly, an inner annular structure intended to be attached to the said drive shaft, and having a bonnet, and secondly an outer annular structure intended to be fixed relative to an inner ring of the said rolling-element bearing, where this outer structure, radially supported on radial support means installed on the inner structure, delimits a raceway the shape of which is complementary to that of the said bonnet, so as to form jointly a ball-joint connection kept in a blocked state by a blocking system including a blocking device installed on the inner structure, where this blocking device projects radially towards the exterior from the bonnet, and penetrates into the said outer structure, and where means forming a mechanical fuse provide the junction between the blocking device and the bonnet, such that the said ball-joint connection is released following the fracture of these means forming a fuse.

According to the invention, the radial support means are provided on said blocking device.

The invention therefore derives its specificity from the design of the radial support means, which are fitted to the blocking device of the ball-joint connection. This therefore contrasts with the solution of the prior art described above, in which the radial support means were constituted by the spherical raceways of the ball-joint connection. In this case, the spherical raceways no longer provide this function, such that there is advantageously no longer any tight adjustment between them. Consequently, when the ball-joint connection is released by the fracture of the means forming the mechanical fuse, this ball-joint connection can operate optimally without being disturbed by the presence of substantial resistant forces.

In addition, the solution provided by the present invention allows improved control of the change of state of the ball-joint connection.

The invention is also advantageous in that it is easy to adjust, and easily adaptable to all technologies of aircraft engines with fan(s), and in particular turbojets.

The said blocking device also preferably provides the axial retention of the inner annular structure relative to the outer annular structure. When the ball-joint connection has been released, the axial forces are then transmitted by the spherical raceways forming this ball-joint connection.

The said blocking device also preferably holds the inner annular structure relative to the outer annular structure, in the tangential direction.

The said blocking device is preferably a ring. It could alternatively be multiple elements spaced circumferentially relative to one another, without going beyond the scope of the invention. As an example, the ring might be circumferentially discontinuous.

The ring preferably has through-passages which are spaced circumferentially relative to one another. These passages enable the mechanical resistance of the junction between the ring and the bonnet to be weakened, which facilitates the formation of a mechanical fuse area.

The blocking device is preferably fitted in a recess of the outer structure, and the said blocking system also includes retaining tabs which are securely attached to this outer structure, fitted in the said recess, and traversing the said passages made in the ring. This solution, called a dog clutch solution, proves to be of particular interest in retaining the inner structure relative to the outer structure, in the tangential direction.

The said radial support means preferably take the form of one or more cylindrical raceways. These cylindrical raceways can be continuous or discontinuous/segmented in the circumferential direction, without going beyond the scope of the invention. They are preferably fitted in the periphery of the blocking device.

The said means forming a mechanical fuse preferably take the form of a narrowed section.

In addition, the invention relates to an aircraft engine including a module as described above. This engine preferably includes three rolling-element bearings interposed between the drive shaft of the fan rotor and the stator of the engine, where these three bearings are spaced axially relative to one another, and include a forward rolling-element bearing associated with a bearing bracket connected to the stator of the engine by a fusible mechanical link, together with an intermediate rolling-element bearing installed on the drive shaft of the fan rotor by the said module.

Other advantages and characteristics of the invention will appear in the non-restrictive detailed disclosure below.

BRIEF DESCRIPTION OF THE ILLUSTRATIONS

This description will be made with reference to the attached illustrations, among which:

DETAILED ACCOUNT OF PREFERRED EMBODIMENTS

Figure 1:
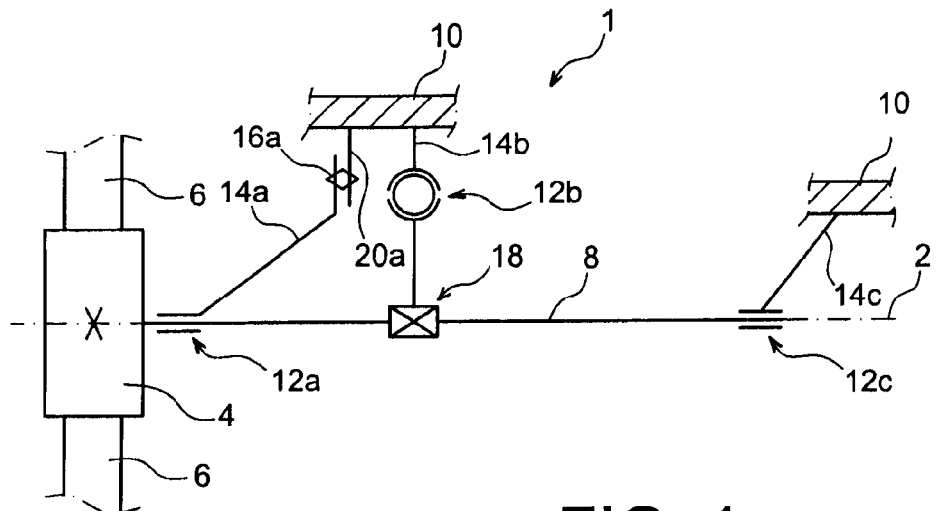
FIG. 1 represents a schematic longitudinal section view of a portion of a turbojet, according to a known design of the prior art.
Figure 2:
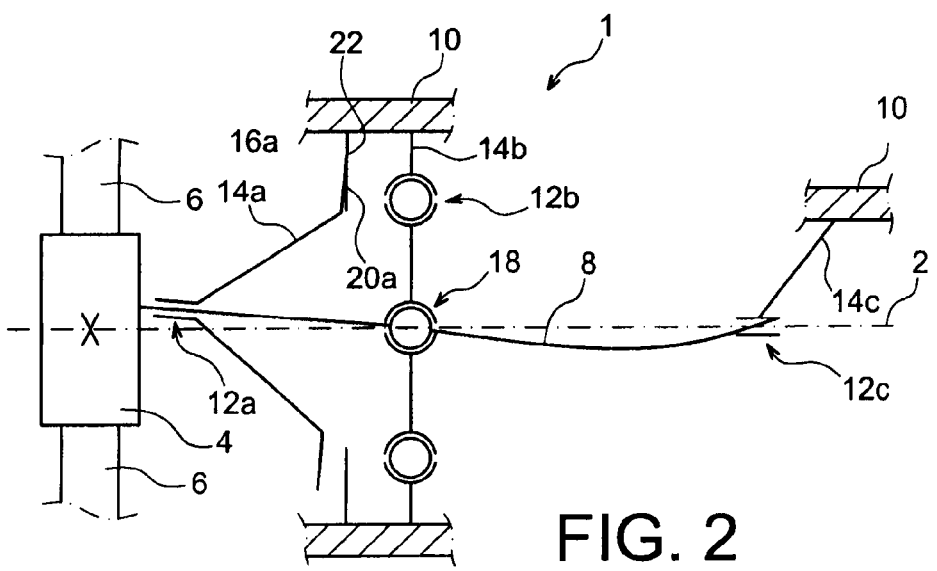
FIG. 2 represents a view similar to that of FIG. 1, with the turbojet in a configuration such as is adopted after the mechanical decoupling of the forward bearing following the loss of a fan blade.
Figure 3:
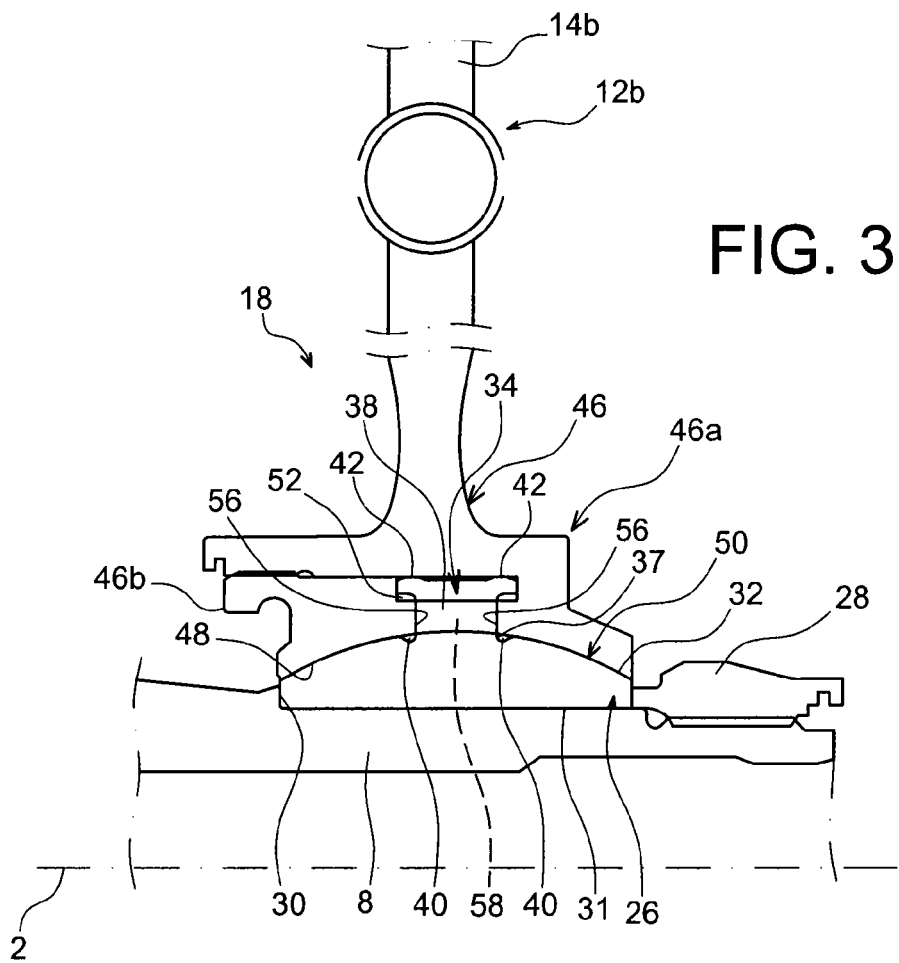
FIG. 3 represents a more detailed half-section view of a connecting module interposed between the intermediate rolling-element bearing and the drive shaft of the rotor of a fan of a turbojet such as the one shown in the previous figures, where the module takes the form of a preferred embodiment of the invention.
Figure 4:
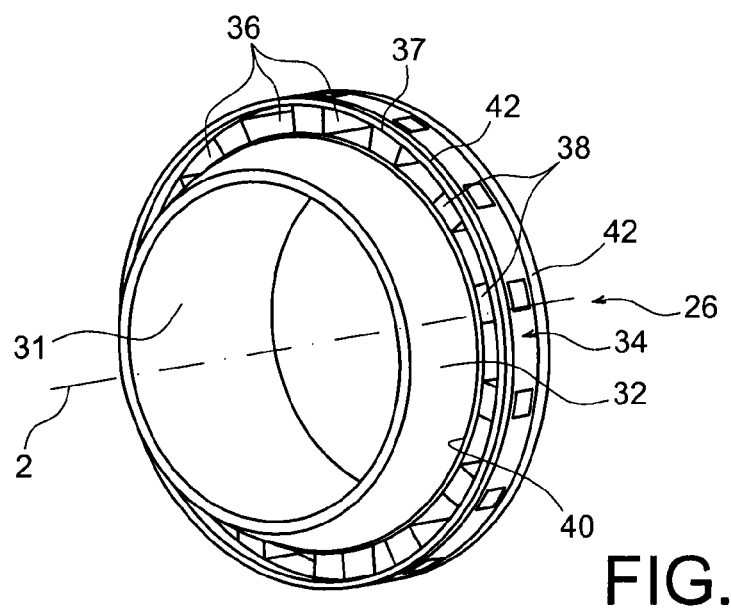
FIG. 4 represents a perspective view of the inner structure of the module of FIG. 3.
Figure 5:
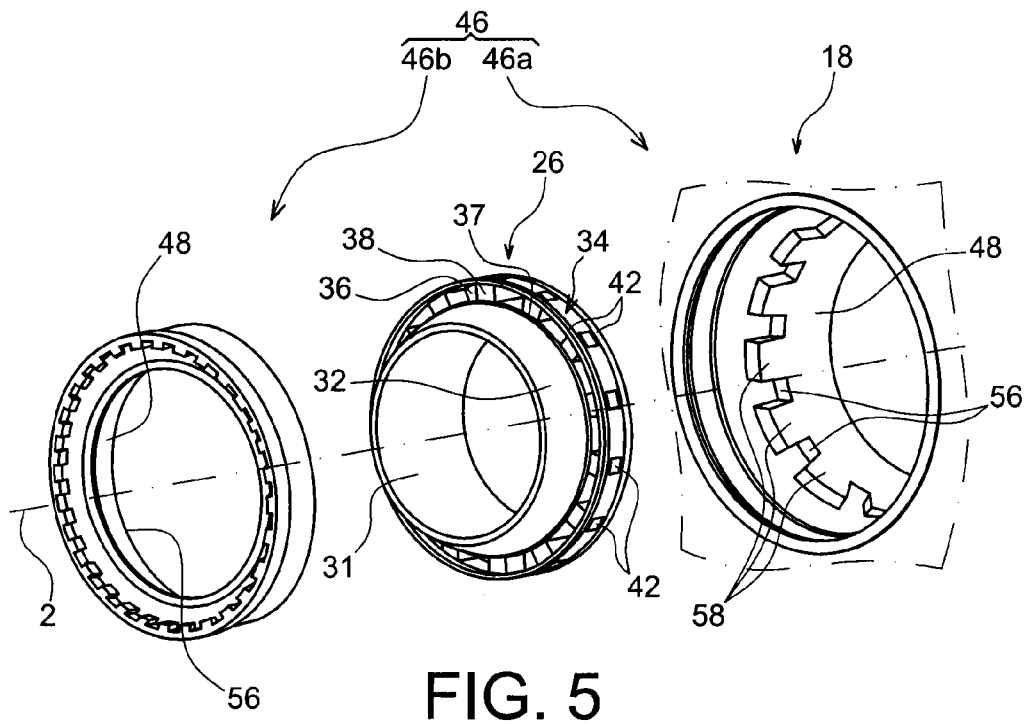
FIG. 5 represents an exploded perspective view of the module of FIG. 3.

With reference to FIGS. 3 to 5, a connecting module 18 is shown interposed between intermediate rolling-element bearing 12b and drive shaft 8 of a fan rotor of a turbojet of the type shown in FIGS. 1 and 2, where module 18 has the form of a preferred embodiment of the invention.

FIGS. 3 to 5 show module 18 in a state as adopted under normal flight conditions, i.e. while the fan has not lost a blade. It firstly has an inner annular structure 26, attached to drive shaft 8 which traverses it through a bore 31 designed for this purpose. This attachment is made using a tightening nut 28 which axially pins structure 26 against an opposite shoulder 30 made on shaft 8. To accomplish this, nut 28 is also positioned around this shaft 8, where the latter is preferentially of hollow design.

At its periphery, outer structure 26 has a bonnet 32, also called a spherical raceway. Its shape is, indeed, overall that of a sphere truncated by two parallel planes, which are equidistant from the centre of this sphere, and orthogonal to axis 2.

Bonnet 32 is dedicated to the formation of a ball-joint connection which is kept blocked under normal flight conditions, as will be described below.

Inner structure 26 also has a blocking device 34 projecting radially towards the exterior from bonnet 32, which it separates by this means into two symmetrical portions relative to a plane orthogonal to axis 2 passing through the centre of the sphere. This blocking device 34 takes the form of a ring centred on the centre of the sphere, where this ring of axis 2 has through-passages 36 positioned radially towards the exterior relative to bonnet 32, and where they are spaced circumferentially relative to one another. The junction between ring 34 and bonnet 32 is therefore made through base 37 of circumferentially spaced slugs 38, which delimit passages 36 between them. Bases 37 are designed to constitute jointly means forming a mechanical fuse between ring 34 and bonnet 32. To accomplish this, these bases 37 can have a narrow section relative to the average section of slugs 38, which narrow section is obtained, for example, by means of two annular machining operations 40 centred on axis 2, undertaken either side of these bases 37. It should be noted that these machining operations 40 form annular cavities in which it is possible to store/accumulate lubricant for the satisfactory operation of the ball-joint connection, when the latter becomes active.

At the periphery of ring 34, radial support means to support an outer structure of the module, which will be described below, are installed. These radial support means in this case take the form of two cylindrical raceways 42, centred on axis 2. These two raceways 42 are spaced axially relative to one another, and positioned such that both cylindrical surfaces of circular section which they delimit form part of the same virtual cylinder. The number and shape of these raceways 42 can be adapted to the constraints and requirements encountered, without going beyond the scope of the invention.

As mentioned above, module 18 also includes an outer annular structure 46 which is fixed relative to an inner ring of intermediate rolling-element bearing 12b. This structure 46 can be installed on the inner bearing ring, or manufactured to form a single part with this ring.

Outer structure 46, which surrounds inner structure 26, is preferably made by means of first portion 46a and a second portion 46b installed on the first, for example by screwing. Both portions 46a, 46b jointly delimit a raceway 48 having a shape complementary to that of bonnet 32, with which it is aligned. Raceways 32, 48 jointly form a ball-joint connection 50 kept in a blocked state by ring 34 of the inner structure. Indeed, this ring 34 penetrates into a recess 52 of outer structure 46, in which this ring is held axially, in both directions. To accomplish this, recess 52, which extends from raceway 48 from which it emerges, and which extends radially towards the exterior from within structure 46, has two opposite axial abutments 56, against which ring 34 is pinned. These two opposite abutments 56, positioned respectively on the two portions 46a, 46b, extend in annular fashion around axis 2 and cooperate more specifically with slugs 38 of ring 34. This tightening results in particular in the axial retention of inner structure 26 relative to outer structure 46.

Module 18 thus includes a system for blocking the ball-joint connection, which includes ring-shaped device 34 and recess 52 which receives this ring. The blocking system is completed by a dog clutch-type system allowing tangential retention of inner structure 26 relative to outer structure 46, in both directions. To accomplish this, first portion 46a of outer structure 46 includes retaining tabs 58, each one of which extends roughly axially, and which are spaced circumferentially relative to one another. These tabs 58, which extend from portion 46a located downstream relative to portion 46b, are fitted in recess 52 and traverse passages 36 made in the ring, extending upstream. This results, indeed, in structures 26, 46 being blocked in the circumferential direction, due to the corporation between slugs 38 and tabs 56, which are fitted in alternating fashion in this same direction.

In this state, ball-joint connection 50 is therefore correctly kept in a blocked state, which prevents it moving between spherical raceways 32, 48, between which there is a slight radial clearance. This clearance is compatible with the thermal environment to which the ball-joint is subject in the most critical fracture case of the turbomachine's operation. Indeed, outer structure 46 is radially supported not by means of the two spherical raceways 32, 48, but through the radial support of the bottom of recess 52 on both cylindrical raceways 42 of ring 34.

Figure 6A:
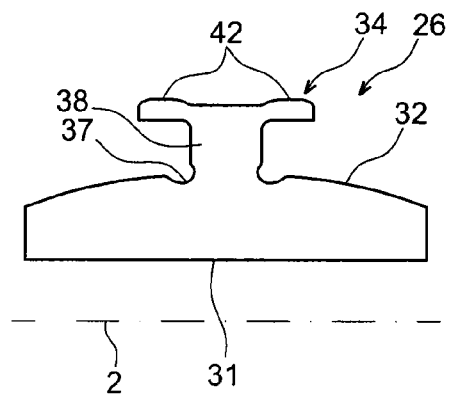
FIGS. 6a and 6b represent half-section schematic views of the inner structure of the module shown in FIGS. 3 to 5, respectively before and after fracture of the means forming the mechanical fuse.
Figure 6B:
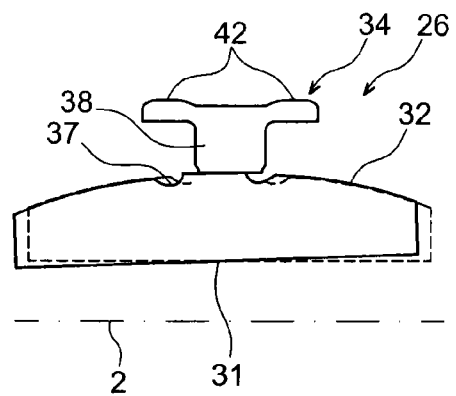

In the event of an exceptional problem leading to the loss of one or more fan blades, the module is subject to very high axial and radial forces which lead to the fracture of the means forming the mechanical fuse, constituted by bases 37 of slugs 38. The ball-joint connection initially kept in the blocked state is then released, as is shown by the sequence of schematic FIGS. 6a and 6b. The axial and tangential retention devices provided by ring 34 then become inoperative, due to the absence of a mechanical link between this ring 34 and spherical raceway 32. After this fracture, the initial slight radial clearance between the spherical raceways can close, which leads them to act like a ball-joint, sliding on one another, at angles which can be controlled. In addition, one or more contacts can be observed between slugs 38 and spherical raceway 32 during movements of the released ball-joint, but they remain negligible compared to the contacts between the two spherical raceways. Alternatively, non-contact of slugs 38 with the bonnet can be predefined at the design stage by allowing, in an appropriate fashion, a clearance adjacent to the fracture area, where this clearance extends over an angular value equal to the displacement of the ball-joint, which is also predefined. The value of this clearance is a compromise between the maximum angular displacement value of the shaft and the useful spherical length which those skilled in the art judge of interest for satisfactory operation of the ball-joint.

Coatings and/or rings can naturally be included on the spherical raceways in order to facilitate sliding and/or lubrication.

Various modifications can naturally be made by those skilled in the art to the invention just described, solely as non-restrictive examples.

The invention claimed is:

1. A connecting module configured to be interposed between a drive shaft of a rotor of a fan of an aircraft engine, and a rolling-element bearing configured to transmit radial and axial forces, the module comprising:
an inner annular structure configured to be attached to the drive shaft, and including a bonnet; and
an outer annular structure configured to be fixed relative to an inner ring of the rolling-element bearing,
wherein the outer structure, radially supported on radial support means installed on the inner structure, delimits a raceway having a shape complementary to a shape of the bonnet, so as to form jointly a ball joint connection kept in a blocked state by a blocking system including a blocking device installed on the inner structure,
wherein the blocking device projects radially towards an exterior from the bonnet, and penetrates into the outer structure,
wherein the module further comprises means forming a mechanical fuse and providing a junction between the blocking device and the bonnet, such that the ball joint connection is released following fracture of the means forming a mechanical fuse, and wherein the radial support means is provided on the blocking device.

2. The module according to claim 1, wherein the blocking device also axially retains the inner annular structure relative to the outer annular structure.

3. The module according to claim 1, wherein the blocking device also retains the inner annular structure relative to the outer annular structure, in a tangential direction.

4. The module according to claim 1, wherein the blocking device is a ring.

5. The module according to claim 4, wherein the ring includes through-passages which are circumferentially spaced relative to one another.

6. The module according to claim 5, wherein the blocking device is fitted in a recess of the outer structure, and the blocking system also includes retaining tabs which are securely attached to the outer structure, fitted in the recess, and traversing the passages made in the ring.

7. The module according to claim 1, wherein the radial support means includes one or more cylindrical raceways.

8. The module according to claim 1, wherein the means forming a mechanical fuse includes a narrowed section.

9. An aircraft engine comprising a module according to claim 1.

10. An engine according to claim 9, further comprising three rolling-element bearings interposed between the drive shaft of the rotor of the fan and a stator of the engine, wherein the three bearings are spaced axially relative to one another, and include a forward rolling-element bearing associated with a bearing bracket connected to the stator of the engine by a fusible mechanical link, together with an intermediate rolling-element bearing installed on the drive shaft of the fan rotor by the module.

* * * * *